(12) United States Patent
Dodge (10) Patent No.: US 7,784,745 B2
(45) Date of Patent: Aug. 31, 2010

(54) TUBE CLIP

(76) Inventor: Robert Dodge, 629 Overbrook Rd., Bloomfield Hills, MI (US) 48302

( * ) Notice: Subject to any disclaimer, the term of this patent is extended or adjusted under 35 U.S.C. 154(b) by 0 days.

(21) Appl. No.: 12/156,485

(22) Filed: Jun. 2, 2008

(65) Prior Publication Data

US 2009/0294600 A1 Dec. 3, 2009

(51) Int. Cl.
*F16L 3/00* (2006.01)
(52) U.S. Cl. .................. 248/73; 248/74.1; 138/149; 138/158
(58) Field of Classification Search .............. 248/74.1, 248/74.2, 74.3, 65, 71, 72, 73; 138/149, 138/158, 166, 165, 167, 112
See application file for complete search history.

(56) References Cited

U.S. PATENT DOCUMENTS

| | | | | |
|---|---|---|---|---|
| 3,370,815 A | * | 2/1968 | Opperthauser | 248/74.2 |
| 3,463,428 A | | 8/1969 | Kindorf et al. | |
| 3,527,432 A | * | 9/1970 | Lytle | 248/62 |
| 4,061,299 A | * | 12/1977 | Kurosaki | 248/73 |
| 4,185,802 A | * | 1/1980 | Myles et al. | 248/74.4 |
| 4,291,855 A | * | 9/1981 | Schenkel et al. | 248/74.1 |
| 4,457,482 A | * | 7/1984 | Kitagawa | 248/74.3 |
| 4,516,296 A | * | 5/1985 | Sherman | 24/279 |
| 4,564,163 A | | 1/1986 | Barnett | |
| 4,669,688 A | * | 6/1987 | Itoh et al. | 248/74.2 |
| D291,177 S | * | 8/1987 | Santucci et al. | D8/395 |
| 4,958,791 A | * | 9/1990 | Nakamura | 248/74.1 |
| 5,022,614 A | * | 6/1991 | Rinderer | 248/62 |
| 5,219,427 A | | 6/1993 | Harris | |
| 5,280,866 A | * | 1/1994 | Ueki | 248/74.2 |
| 5,642,557 A | * | 7/1997 | Clews | 24/339 |
| 5,868,362 A | * | 2/1999 | Daoud | 248/71 |
| 5,873,550 A | | 2/1999 | Phillips | |
| 6,105,216 A | | 8/2000 | Opperthauser | |
| 6,612,525 B2 | * | 9/2003 | Bagdi | 248/71 |
| 7,053,311 B2 | * | 5/2006 | Santanda | 174/154 |
| 7,523,898 B1 | * | 4/2009 | Barry et al. | 248/71 |
| 2002/0108662 A1 | * | 8/2002 | Opperthauser | 138/149 |
| 2005/0258314 A1 | * | 11/2005 | Schilles et al. | 248/74.1 |
| 2008/0173773 A1 | * | 7/2008 | Opperthauser | 248/74.1 |

FOREIGN PATENT DOCUMENTS

| GB | 2357117 A | * | 6/2001 |
|---|---|---|---|
| JP | 52058118 A | * | 5/1977 |

* cited by examiner

*Primary Examiner*—Kimberly T Wood
(74) *Attorney, Agent, or Firm*—Clark Hill PLC (57) ABSTRACT

A tube clip is mounted to a channel-section track and is used to secure a pipe. The channel-section track includes a pair of upper engagement surfaces having inwardly turned flanges spaced apart by a slot. The tube clip includes an integrally molded, one-piece elongated cylindrical body that extends along a first axis and defines a center bore for receiving the pipe therethrough. A base is fixedly secured to the cylindrical body and includes a pair of support surfaces spaced apart along the first axis. Each support surface includes a fin for engaging one of the upper engagement surfaces of the channel-section track to bias the tube clip therefrom. A pair of flexible legs extends from the base portion. The legs are spaced apart along the first axis and each leg is adapted to selectively lockingly engage one of the flanges when the tube clip is mounted to the channel-section track.

26 Claims, 6 Drawing Sheets

TUBE CLIP

BACKGROUND OF THE INVENTION

1. Field of the Invention

The invention relates to a tube clip for supporting a pipe along a support structure.

2. Description of Related Art

Pipes, such as copper pipes, are commonly used to convey or transfer fluids or gases in various industrial applications, such as sprinkler systems, refrigeration systems, and heating and cooling systems. In a typical application, a pipe is disposed along a support structure, such as a ceiling or wall. The pipe is commonly supported along the ceiling by a plurality of spaced apart clevis hangers. Each clevis hanger typically includes an upper member mounted to the ceiling, and a generally U-shaped lower member for supporting the pipe. The shape of the U-shaped lower member complements that of an outer periphery of the pipe, thereby allowing the U-shaped lower member to retain the pipe therein. An example of this type of clevis hanger is disclosed in U.S. Pat. No. 5,219,427 to Harris.

Alternatively, the pipe is supported along the ceiling or wall by lengths of channel-section track secured thereto on which are mounted spaced apart support devices or pipe mounting clamps that are clamped to the pipe. U.S. Pat. No. 5,873,550 to Phillips discloses a support device for securing a pipe to a length of channel-section track. The support device includes a clip for retaining the pipe, and a track-engagement portion connected to the clip. A two-part foot forming the track-engagement portion is inserted into the track and by rotating the support device through 90 degrees it is cammingly engaged with the track.

U.S. Pat. No. 3,463,428 to Kindorf et al. discloses a generally U-shaped clamp for securing a pipe to a channel-shaped support of the type having inwardly extending flanges defining a longitudinally extending slot. The clamp includes two metal straps, each strap having at least one notch on each edge of a part insertable in the slot for engagement with opposite flanges. Each strap includes a curved portion projecting away from the flanges to embrace the pipe and adjustable means extending between the ends to draw them together to embrace the pipe.

It is desirable to provide an improved tube clip for supporting a length of pipe having an integrated mounting structure for mounting the tube clip to a length of channel-section track. It is also desirable to provide a tube clip that can be easily and securely attached to a length of channel-section track.

SUMMARY OF THE INVENTION

According to one aspect of the invention, a tube clip is provided for securing and supporting a pipe to a length of channel-section track. The channel-section track includes a pair of upper engagement surfaces having inwardly turned flanges that are spaced apart by a slot. The tube clip includes an integrally molded, one-piece elongated cylindrical body that extends along a first axis and defines a center bore for receiving the pipe therethrough. A base is fixedly secured to the cylindrical body and includes a pair of support surfaces spaced apart along the first axis. First and second pairs of flexible legs extend from the base. The first pair of flexible legs is spaced apart from the second pair of flexible legs along a second axis. Each of the first pair of flexible legs is spaced apart along the first axis and is adapted to selectively lockingly engage one of the flanges when said tube clip is mounted to the channel-section track. Similarly, each of the second pair of flexible legs is spaced apart along the first axis and is adapted to selectively lockingly engage one of the flanges when said tube clip is mounted to the channel-section track. Each support surface includes a first fin disposed adjacent to one of the first pair of flexible legs and a second fin adjacent to one of the second pair of flexible legs. The first and second fins are adapted for engaging one of the upper engagement surfaces of the channel-section track to bias the tube clip therefrom.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
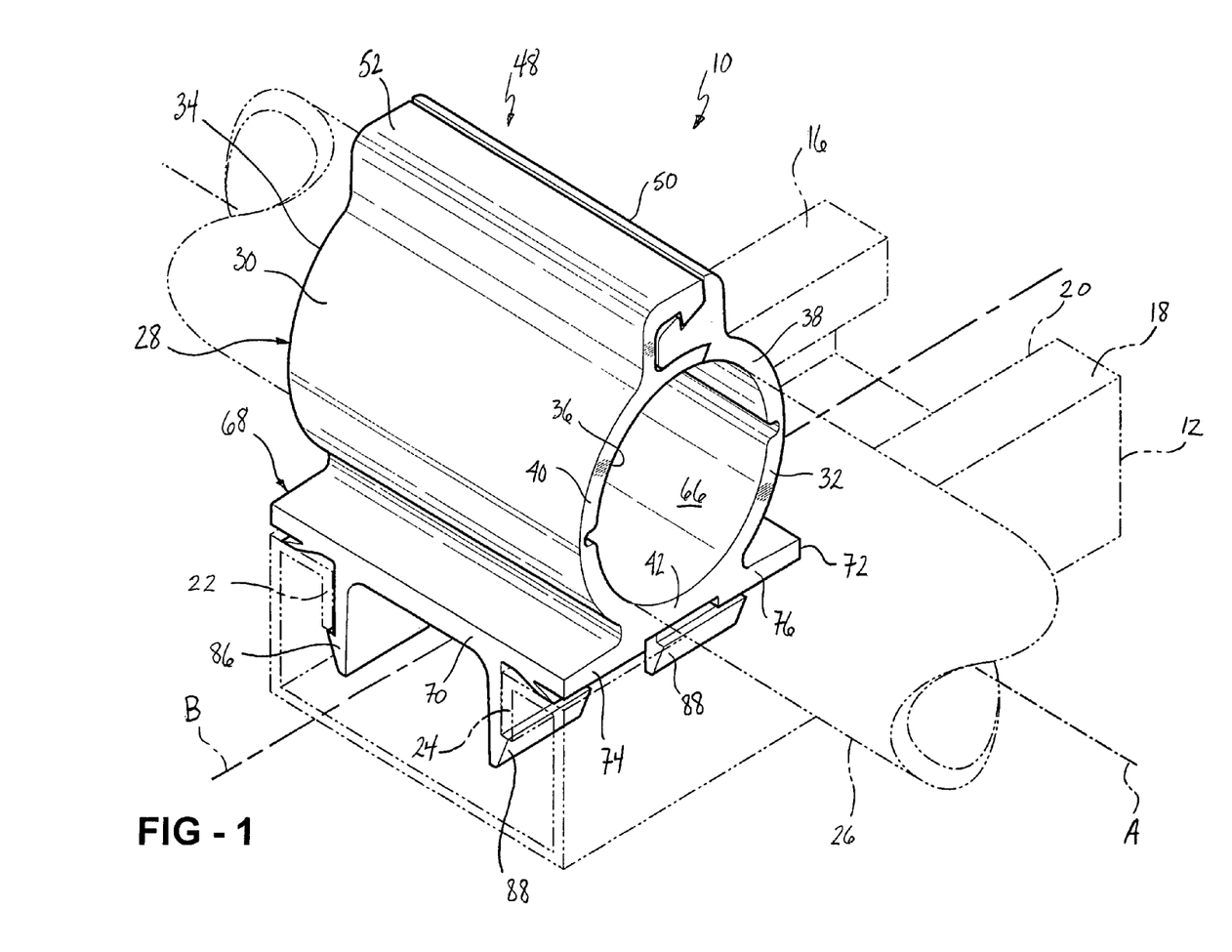
FIG. 1 is a perspective view of a tube clip mounted to a channel-section track supporting a pipe according to the invention.

A tube clip, generally shown at 10 in FIG. 1, is mounted to a length of channel-section track 12 which is secured to a generally planar supporting structure (not shown), such as a floor, ceiling, wall or similar surface. The channel-section track 12 is commonly known in the art and includes a pair of upper engagement surfaces 16, 18 spaced apart by a slot 20 extending longitudinally between opposing ends. Each upper engagement surface 16, 18 includes an inwardly turned edge or flange 22, 24. The tube clip 10 supports an elongated tubular pipe 26 for transferring fluids or gases therethrough. The pipe 26 is cylindrical, hollow and commonly formed of aluminum or copper and is utilized for hydraulic pipes, pneumatic tubes, refrigeration lines, water pipes, and the like, as are typically known in the art. The pipe 26 extends in a direction along a first axis A and the channel-section track 12 extends in a direction along a second axis B. In the embodiment shown, the first axis A extends in a longitudinal direction and the second axis B extends in a latitudinal direction perpendicular to the longitudinal direction. It is appreciated that the first axis A could be oriented at any angle relative to the second axis B without varying from the scope of the invention.

Referring to FIGS. 1 through 6, the tube clip 10 for supporting the pipe 26 is a one-piece, integrally molded plastic device. The tube clip 10 includes an elongated cylindrical body, generally indicated at 28. The cylindrical body 28 includes an arcuate tube wall 30 extending along the first axis A between first 32 and second 34 ends. The tube wall 30 defines a center bore 36 for receiving the pipe 26 therethrough.

Figure 2:
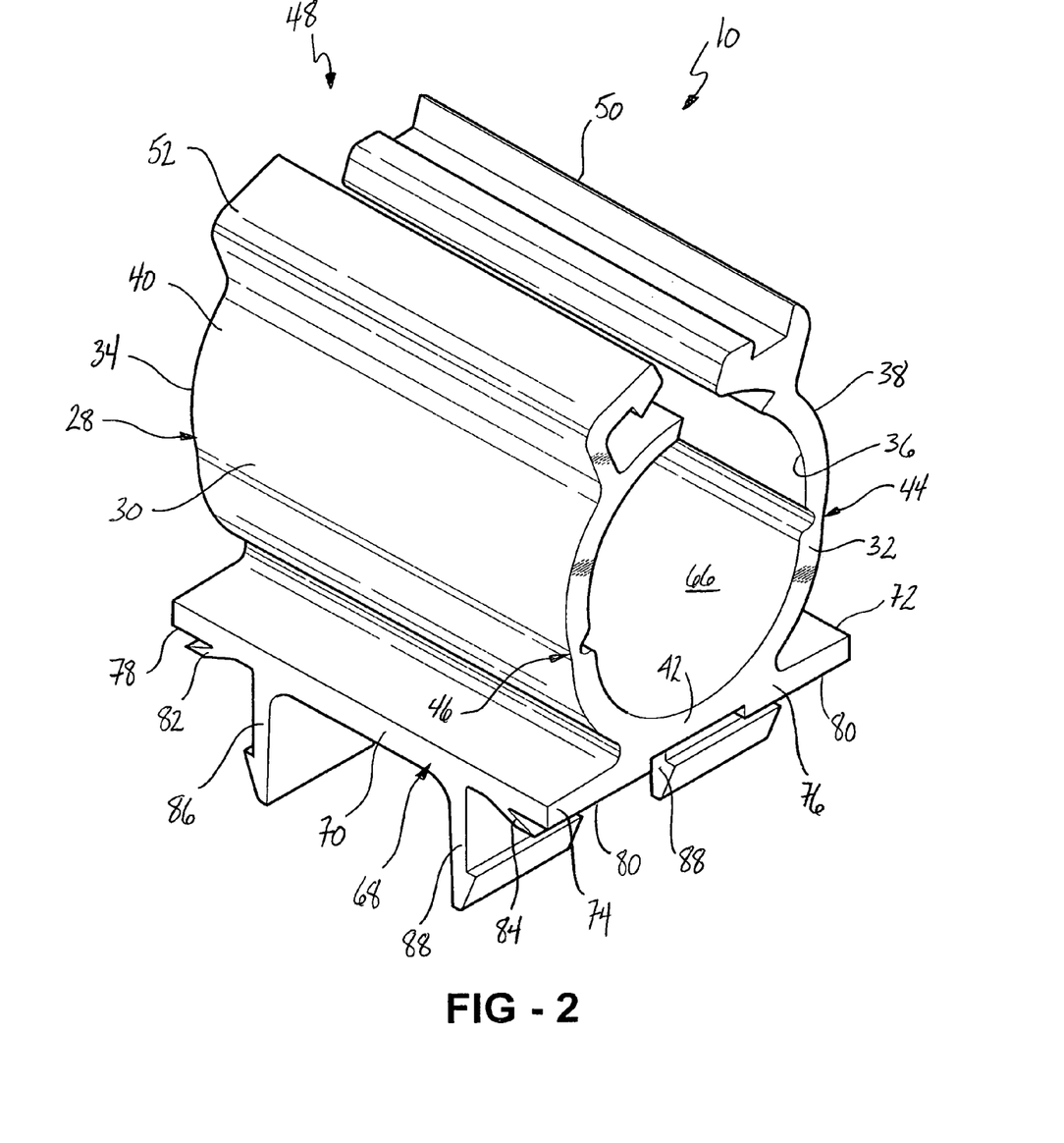
FIG. 2 is a perspective view of the tube clip in an open position.
Figure 3:
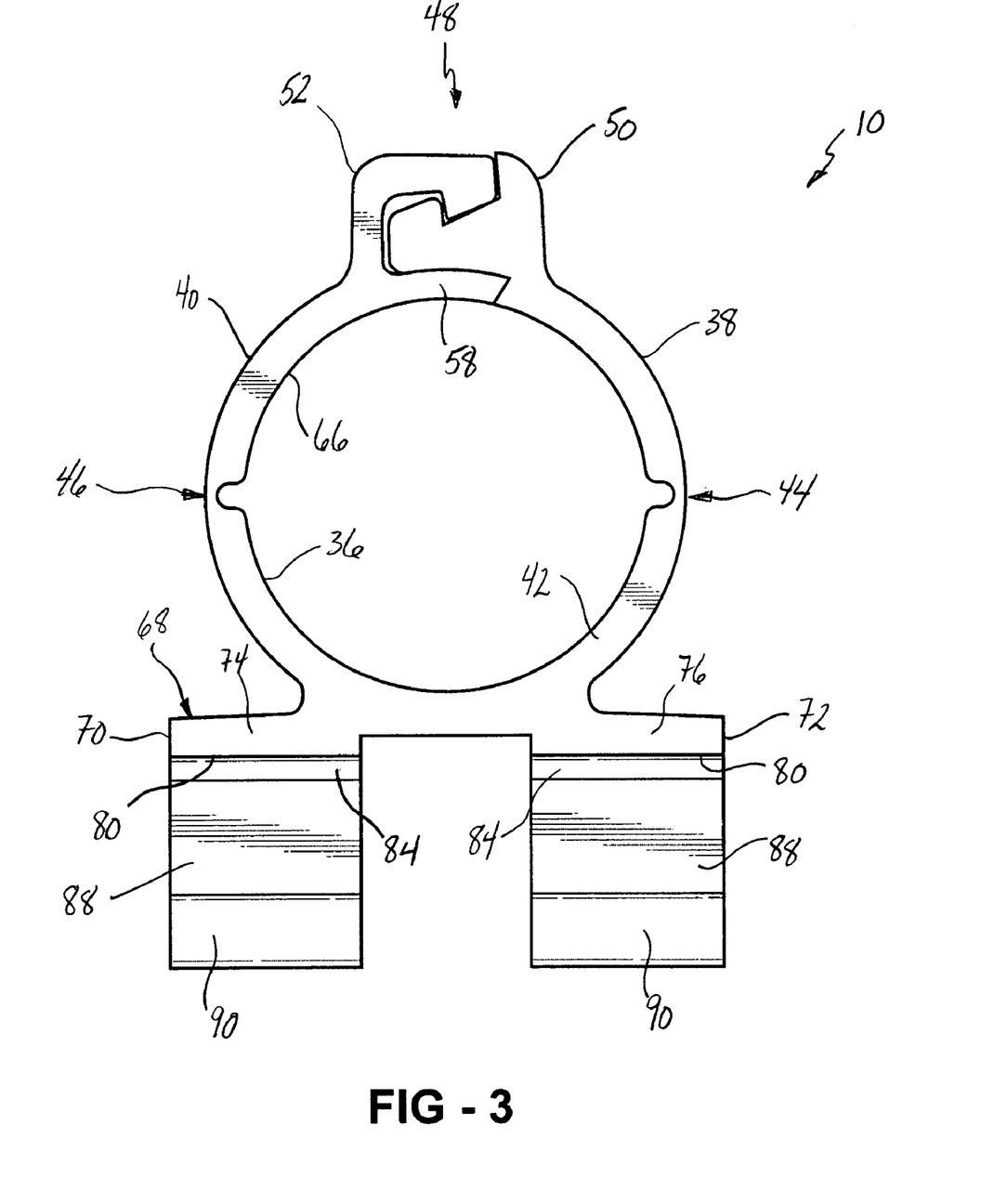
FIG. 3 is a front view of the tube clip in a closed position.
Figure 4:
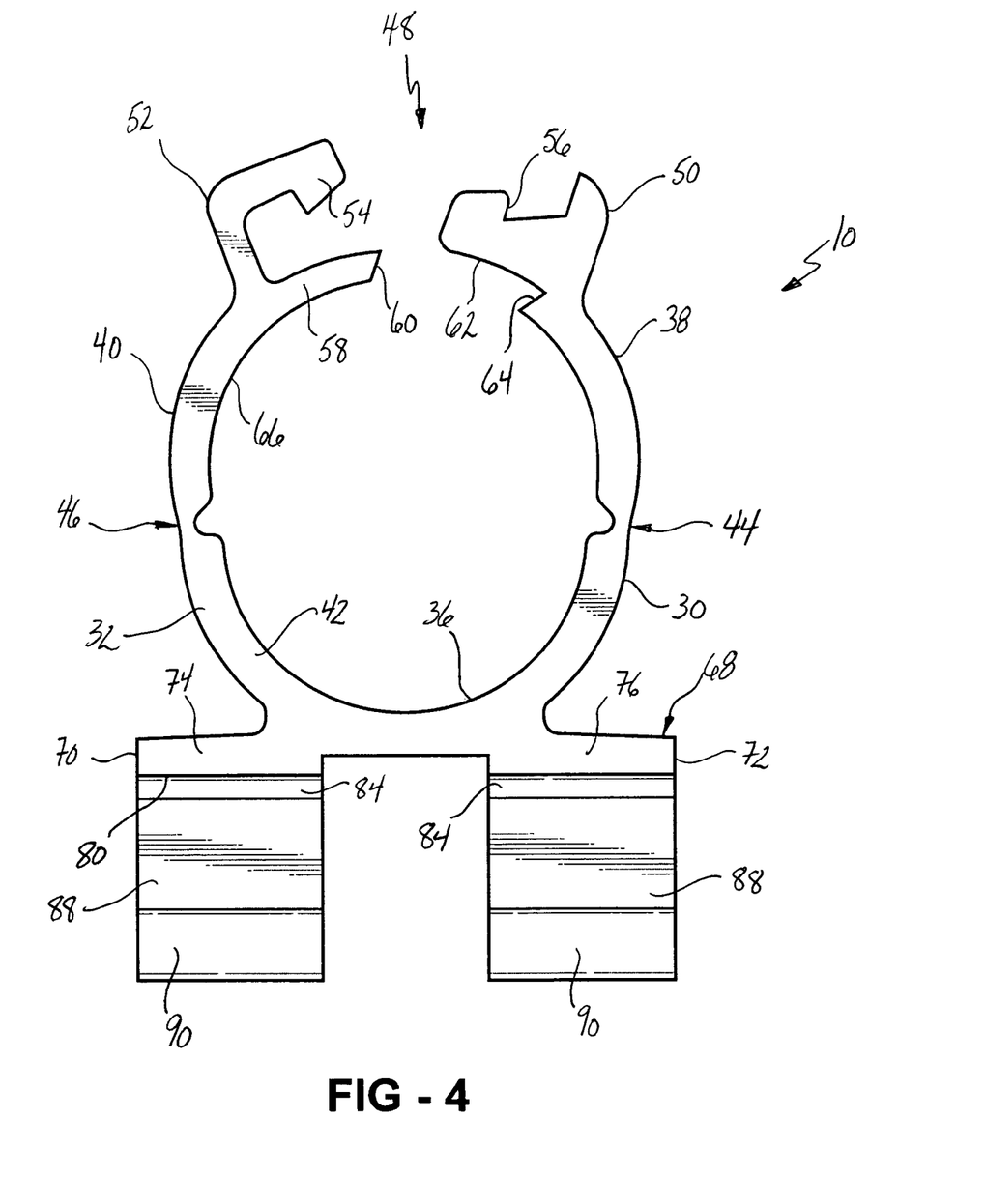
FIG. 4 is a front view of the tube clip in the open position.
Figure 5:
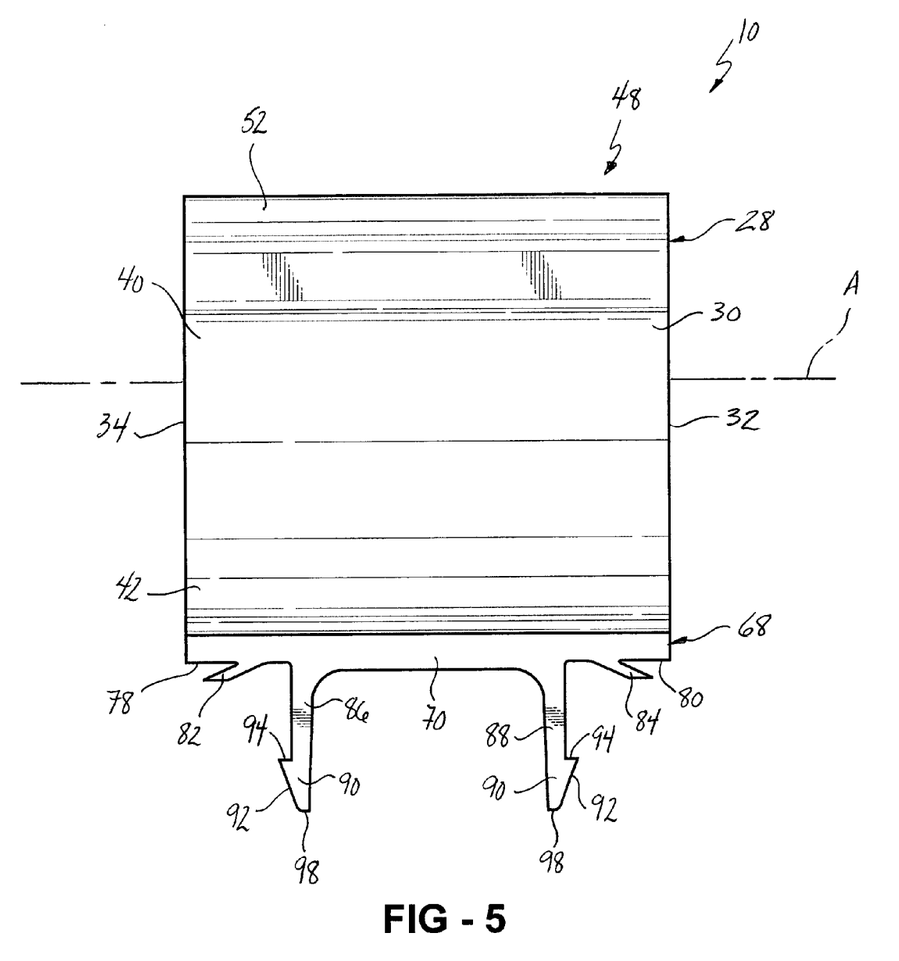
FIG. 5 is a side view of the tube clip.
Figure 6:
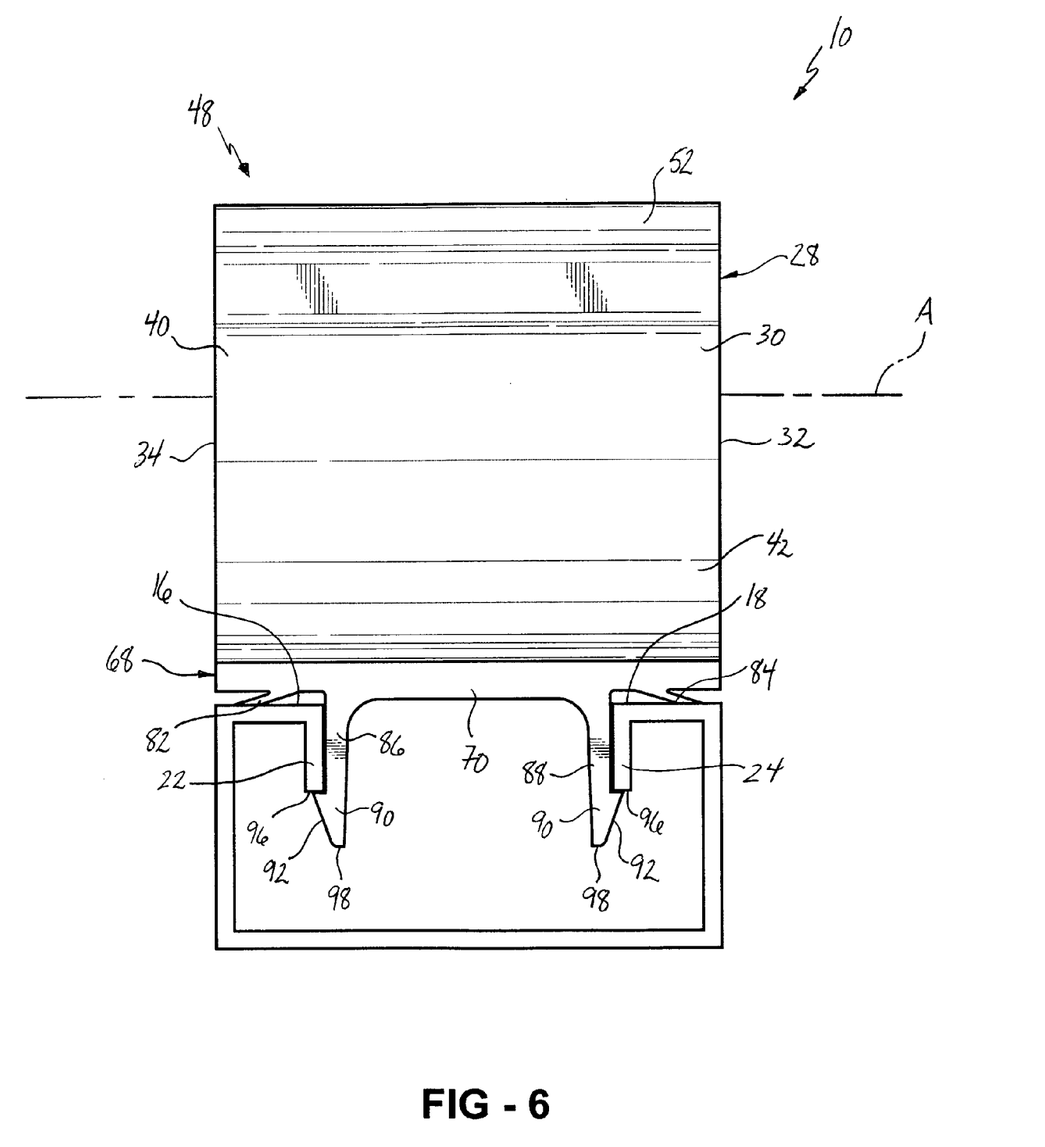
FIG. 6 is a side view of the tube clip mounted to the channel-section track.

The tube wall 30 of the cylindrical body 28 is split longitudinally from the first end 32 to the second end 34 dividing the cylindrical body 28 into a first body portion 38 and a second body portion 40. Each of the first 38 and second 40 body portions are flexibly connected to a lower body portion 42 by a living hinge 44 and 46, respectively. The living hinges 44, 46 allow the first 38 and second 40 body portions to flexibly pivot between an open position to receive the pipe 26, as shown in FIGS. 2 and 4, and a closed position surrounding the pipe 26, as shown in FIGS. 1 and 3. In the embodiment shown, the cylindrical body 28 includes two living hinges 44 and 46, however, it is appreciated that any number of living hinges may be incorporated to provide for greater flexibility of the tube wall 30 without varying from the scope of the invention.

Referring to FIGS. 3 and 4, the tube clip 10 includes an integrated closure mechanism or releasable clamp, generally shown at 48, for securing the first 38 and second 40 body portions together in the closed position. The clamp 48 extends longitudinally along the split in the tube wall 30 between the first 32 and second 34 ends thereof. The clamp 48 includes a male member 50 and a female member 52. The male member 50 is integrally formed at an end of the first body portion 38 opposite the living hinge 44 and the female member 52 is integrally formed at an end of the second body portion 40 opposite the living hinge 46. Alternatively, the male member 50 could be disposed at the end of the second body portion 40 and the female member 52 could be disposed at the end of the first body portion 38 without varying from the scope of the invention.

The male 50 and female 52 members are shaped complementarily to each other. More specifically, a shoulder 54 protruding from the female member 52 lockingly engages a notch 56 formed in the male member 50 when the first 38 and second 40 body portions are in the closed position. In addition, the female member 52 includes a tongue 58 extending circumferentially with the tube wall 30 and having a first end surface 60. The male member 50 defines a recessed step 62 for receiving the tongue 58 and having a second end surface 64. In use, the first end surface 60 is parallel to and abuts the second end surface 64 prior to the shoulder 54 lockingly engaging the notch 56 to create tension between the shoulder 54 and notch 56, thereby retaining the first 38 and second 40 body portions in the closed position. The tongue 58 creates a smooth inner surface 66 a full 360 degrees around the inside of the tube wall 30 for engagement or contact with an outer surface of the pipe 26. The male 50 and female 52 members are disengaged and pulled away from each other to separate the first 38 and second 40 body portions into the open position.

In the embodiment shown, the first end surface 60 of the female member 52 generally forms an obtuse angle relative to the inner surface 66 of the tube wall 30 and the second end surface 64 of the male member 50 generally forms an acute angle relative to the inner surface 66 of the tube wall 30. The angles are supplementary. In other words the two angles sum to approximately 180 degrees. It is contemplated that the angles formed by the first 60 and second 64 end surfaces relative to the inner surface 66 of the tube wall 30 could be any pair of supplementary angles without varying from the scope of the invention.

The tube clip 10 also includes a base, generally indicated at 68, protruding from the lower body portion 42 of the tube wall 30 opposite the clamp 48. The base 68 extends in the direction along the first axis A the entire length of the cylindrical body 28 between the between first 32 and second 34 ends. The base 68 also extends in the direction along the second axis B between a first side 70 and a second side 72. A first base portion 74 is spaced apart from a second base portion 76 in the direction along the second axis B. Each of the first 74 and second 76 base portions include a pair of support surfaces 78, 80 which are spaced apart in the direction along the first axis A and cooperate with the respective engagement surfaces 16, 18 of the channel-section track 12 when the tube clip 10 is mounted thereto. The support surfaces 78, 80 include a flexible fin 82, 84 disposed along the length of the respective first 74 and second 76 base portions. The flexible fins 82, 84 extend outwardly at an angle from the respective support surfaces 78, 80. In the embodiment shown, the fins 82, 84 do not extend past the first 32 and second 34 ends of the first 74 and second 76 base portions. The fins 82, 84 flex toward the respective support surfaces 78, 80 upon engagement with the respective engagement surfaces 16, 18 to bias the tube clip 10 away from the channel-section track 12, the purpose of which will become apparent below.

Each of the first 74 and second 76 base portions also include a pair of flexible legs 86, 88 extending generally perpendicularly therefrom. The legs 86, 88 are spaced apart in the direction along the first axis A such that each leg 86, 88 will selectively lockingly engage one of the flanges 22, 24 of the channel-section track 12 when the tube clip 10 is mounted thereto. As such, each leg 86, 88 includes a foot 90 that includes a tapered outer edge 92. The tapered outer edges 92 engage the respective flanges 22, 24 to deflect the legs 86, 88 inwardly and allow the legs 86, 88 to be inserted into the slot 20 as the tube clip 10 is mounted to the channel-section track 12. Additionally, each foot 90 includes a step 94 for lockingly engaging an end 96 of the respective flange 22, 24 to secure the tube clip 10 to the channel-section track 12. Each tapered outer edge 92 tapers outwardly from a distal end 98 of the respective leg 86, 88 to the step 94.

In order to engage the step 94 of the legs 86, 88 with the end 96 of the flanges 22, 24 it is necessary to compress or flex the fins 82, 84 toward the respective support surfaces 78, 80 by pushing the tube clip 10 against the respective engagement surfaces 16, 18 of the channel-section track 12. The fins 82, 84 will compress until the step 94 of the legs 86, 88 is disposed past the end 96 of the flanges 22, 24. The tube clip 10 is then released and the fins 82, 84 push against the respective engagement surfaces 16, 18 to bias the tube clip 10 away from the channel-section track 12, which in turn is prevented by the step 94 of the legs 86, 88 lockingly engaging the end 96 of the flanges 22, 24. Thus, the tube clip 10 is locked to the channel-section track 12.

As previously stated, the purpose of the fins 82, 84 is to bias the tube clip 10 away from the channel-section track 12 such that the step 94 of the legs 86, 88 lockingly engages the end 96 of the flanges 22, 24. As such, the bias of the fins 82, 84 eliminates any slop or looseness between the tube clip 10 and the channel-section track 12. Slop or looseness between the tube clip 10 and the channel-section track 12 may be due to the length of the legs 86, 88 being too long or the length of the flanges 22, 24 being too short such that a secure engagement between the step 94 of the legs 86, 88 and the end 96 of the flanges 22, 23 is not attained. It is therefore appreciated that with the fins 82, 84 to eliminate any slop or looseness between the tube clip 10 and the channel-section track 12, the tolerances of the length of the legs 86, 88 and flanges 22, 24 do not have to be as tightly controlled as is otherwise necessary.

The bias of the fins 82, 84 maintains the step 94 of the legs 86, 88 lockingly engaged with the end 96 of the flanges 22, 24 to keep the tube clip 10 secured in place. Thus, once the tube clip 10 is mounted to the channel-section track 12, the fins 82, 84 prevent any unwanted sliding or movement of the tube clip 10 relative to the channel-section track 12 in the direction along the second axis B. It is appreciated however, that by pressing downwardly on the tube clip 10 to compress the fins 82, 84 the step 94 of the legs 86, 88 disengages from the end 96 of the flanges 22, 24 so that the tube clip 10 may be repositioned anywhere along the channel-section track 12 without having to completely remove the tube clip 10 therefrom.

The fins 82, 84 also provide energy absorption capabilities. More specifically, because the fins 82, 84 compress and flex, any vibrations or shockwaves caused by the fluid or gas traveling through the pipe 26 will be reduced or eliminated.

The tube clip 10 can first be secured around the pipe 26 and then mounted to the channel-section track 12. Alternatively, the tube clip 10 can first be mounted to the channel-section track 12 and then the tube clip 10 is secured around the pipe 26. In addition, once the tube clip 10 is mounted to the channel-section track 12 the male 50 and female 52 members of the clamp 48 can be pulled away from each other to flexibly separate the first 38 and second 40 body portions into the open position to release the pipe 26 from the tube clip 10.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A tube clip for securing a pipe to a channel-section track including a pair of upper engagement surfaces having inwardly turned flanges spaced apart by a slot, said tube clip comprising:
   an integrally molded, one-piece elongated cylindrical body extending along a first axis defining a center bore for receiving the pipe therethrough;
   a base fixedly secured to said cylindrical body including a pair of support surfaces spaced apart along said first axis, wherein each of said pair of support surfaces includes a fin for engaging one of the upper engagement surfaces of the channel-section track to bias said tube clip therefrom;
   a first pair of flexible legs extending from said base, wherein each of said first pair of flexible legs is spaced apart along said first axis and is adapted to selectively lockingly engage one of the flanges when said tube clip is mounted to the channel-section track; and
   a second pair of flexible legs extending from said base, wherein said first and second pairs of flexible legs are spaced apart along a second axis oriented perpendicularly to said first axis, and wherein each of said second pair of flexible legs is spaced apart along said first axis and is adapted to selectively lockingly engage one of the flanges when said tube clip is mounted to the channel-section track.

2. A tube clip as set forth in claim 1 wherein each of said pair of support surfaces includes a first fin adjacent one of said first pair of flexible legs and a second fin adjacent one of said second pair of flexible legs.

3. A tube clip as set forth in claim 1 wherein said base includes a first base portion spaced apart from a second base portion along a second axis, wherein said first base portion includes a first pair of support surfaces spaced apart along said first axis, each of said first pair of support surfaces including a first fin for engaging one of the upper engagement surfaces of the channel-section track to bias said tube clip therefrom, and wherein said second base portion includes a second pair of support surfaces spaced apart along said first axis, each of said second pair of support surfaces including a second fin for engaging one of the upper engagement surfaces of the channel-section track to bias said tube clip therefrom.

4. A tube clip as set forth in claim 3 wherein said first base portion includes a first pair of flexible legs extending therefrom, each of said first pair of flexible legs spaced apart along said first axis and adapted to selectively lockingly engage one of the flanges when said tube clip is mounted to the channel-section track, and wherein said second base portion includes a second pair of flexible legs extending therefrom, each of said second pair of flexible legs spaced apart along said first axis and adapted to selectively lockingly engage one of the flanges when said tube clip is mounted to the channel-section track.

5. A tube clip as set forth in claim 4 wherein said first and second base portions define first and second widths extending in a direction parallel to said second axis.

6. A tube clip as set forth in claim 5 wherein each of said first fins extend entirely said first width of said first base portion and each of said second fins extend entirely said second width of said second base portion.

7. A tube clip as set forth in claim 6 wherein each of said first pair of flexible legs extend entirely said first width of said first base portion and each of said second pair of flexible legs extend entirely said second width of said second base portion.

8. A tube clip as set forth in claim 7 wherein each of said first pair of flexible legs extends perpendicularly to said first pair of support surfaces and each of said second pair of flexible legs extends perpendicularly to said second pair of support surfaces.

9. A tube clip as set forth in claim 8 wherein each of said first pair of flexible legs and each of said second pair of flexible legs includes a foot having a step for lockingly engaging one of the flanges.

10. A tube clip as set forth in claim 9 wherein each of said first pair of flexible legs and each of said second pair of flexible legs includes a tapered outer edge, tapering outwardly from a distal end to said step.

11. A tube clip as set forth in claim 10 wherein said cylindrical body extends along said first axis between first and second ends and said cylindrical body is split parallel to said first axis between said first and second ends on a side opposite from said base thereby defining a first body portion and a second body portion.

12. A tube clip as set forth in claim 11 including a releasable clamp extending parallel to said first axis for securing said first and second body portions together.

13. A tube clip as set forth in claim 12 wherein said first body portion is flexibly coupled to a lower body portion by a first living hinge and said second body portion is flexibly coupled to said lower body portion by a second living hinge, and wherein said first and second living hinges allow said first and second body portions to move between an open position for receiving the pipe and a closed position for retaining the pipe.

14. A tube clip as set forth in claim 12 wherein said base is fixedly secured to said lower body portion.

15. A tube clip as set forth in claim 14 wherein said releasable clamp includes a female member integral with one of said first and second body portions and a male member integral with the other of said first and second body portions, and wherein said female member defines a shoulder for locking engagement with a notch defined in said male member.

16. A tube clip as set forth in claim 15 wherein said female member defines a tongue extending circumferentially with said cylindrical body and having a first end surface and said male member defines a recessed step for receiving said tongue and having a second end surface for abutting said first end surface prior to said locking engagement between said female and male members.

17. A tube clip as set forth in claim 16 wherein said first end surface of said female member is parallel to said second end surface of said male member.

18. A tube clip as set forth in claim 17 wherein said cylindrical body includes an inner surface for engagement with the pipe and one of said first and second end surfaces forms an obtuse angle with said inner surface and the other of said first and second end surfaces forms an acute angle with said inner surface, whereby said obtuse and acute angles are supplementary.

19. A tube clip as set forth in claim 18 wherein said first axis is oriented perpendicularly to said second axis.

20. A tube clip for securing a pipe to a channel-section track including a pair of upper engagement surfaces having inwardly turned flanges spaced apart by a slot, said tube clip comprising:
   an integrally molded, one-piece elongated cylindrical body extending along a first axis between first and second ends, said cylindrical body defining a center bore for receiving the pipe therethrough;
   a base fixedly secured to said cylindrical body, said base extending along said first axis between said first and second ends and extending along a second axis between a first side and a second side, said base including a pair of support surfaces directly adjacent said first and second ends and spaced apart along said first axis, wherein each of said pair of support surfaces includes a fin for engaging one of the upper engagement surfaces of the channel-section track to bias said tube clip therefrom;
   a first pair of flexible legs extending from said base directly adjacent said first side, wherein each of said first pair of legs is spaced apart along said first axis and is adapted to selectively lockingly engage one of the flanges when said tube clip is mounted to the channel-section track; and
   a second pair of flexible legs extending from said base directly adjacent said second side and spaced apart from said first pair of flexible legs along said second axis, wherein each of said second pair of legs is spaced apart along said first axis and is adapted to selectively lockingly engage one of the flanges when said tube clip is mounted to the channel-section track.

21. A tube clip as set forth in claim 20 wherein each said fin does not extend outwardly past said first and second ends of said cylindrical body.

22. A tube clip as set forth in claim 21 wherein said first axis is oriented perpendicularly to said second axis.

23. A tube clip as set forth in claim 22 wherein each of said pair of support services includes a first fin disposed between said first or second end of said base and one of said first pair of flexible legs and a second fin disposed between said first or second end of said base and one of said second pair of flexible legs.

24. A tube clip as set forth in claim 23 wherein said first and second pairs of flexible legs define first and second widths extending in a direction parallel to said second axis.

25. A tube clip as set forth in claim 24 wherein said first fins extend entirely said first width of said first pair of flexible legs and said second fins extend entirely said second width of said second pair of flexible legs.

26. A tube clip for securing a pipe to a channel-section track including a pair of upper engagement surfaces having inwardly turned flanges spaced apart by a slot, said tube clip comprising:
   an integrally molded, one-piece elongated cylindrical body extending along a first axis defining a center bore for receiving the pipe therethrough;
   a base fixedly secured to said cylindrical body, said base including a first base portion spaced apart from a second base portion along a second axis perpendicular to said first axis, wherein each of said first and second base portions include a pair of support surfaces spaced apart along said first axis, and wherein each of said pair of support surfaces of said first and second base portions includes a fin extending in a direction parallel to said second axis for engaging one of the upper engagement surfaces of the channel-section track to bias said tube clip therefrom;
   a first pair of flexible legs extending from said first base portion, each of said first pair of flexible legs spaced apart along said first axis and adapted to selectively lockingly engage one of the flanges when said tube clip is mounted to the channel-section track, and
   a second pair of flexible legs extending from said second base portion, each of said second pair of flexible legs spaced apart along said first axis and adapted to selectively lockingly engage one of the flanges when said tube clip is mounted to the channel-section track.

* * * * *